INVENTOR.
OSCAR H. GRAUER
BY
*Leonard L. Kalish*
ATTORNEY

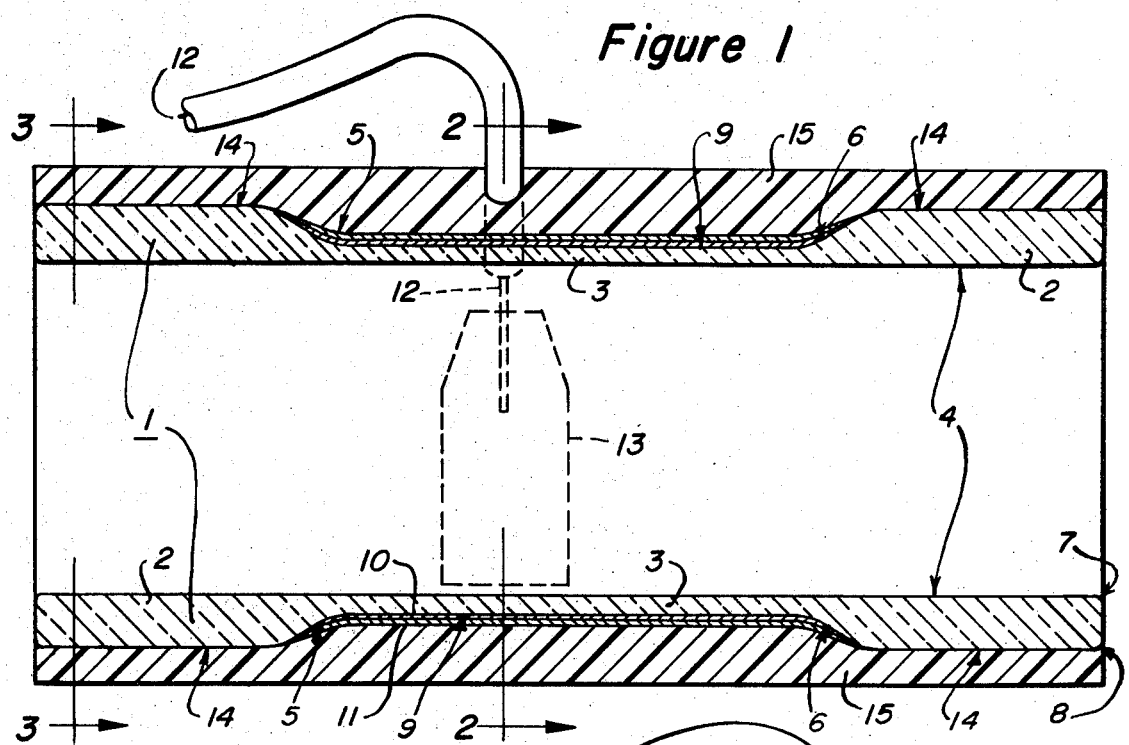
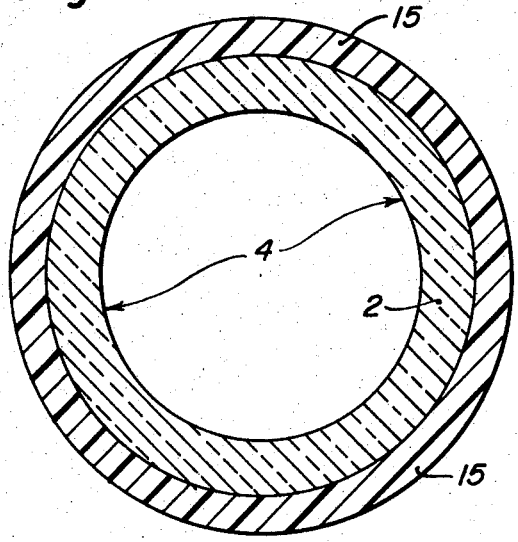
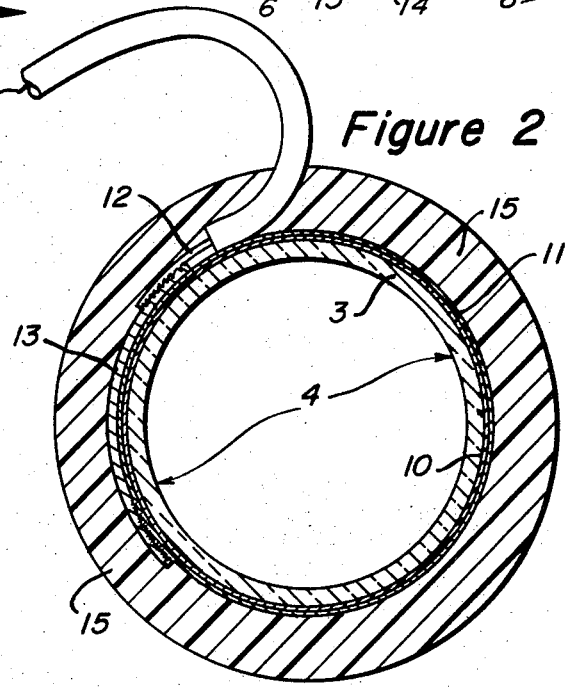

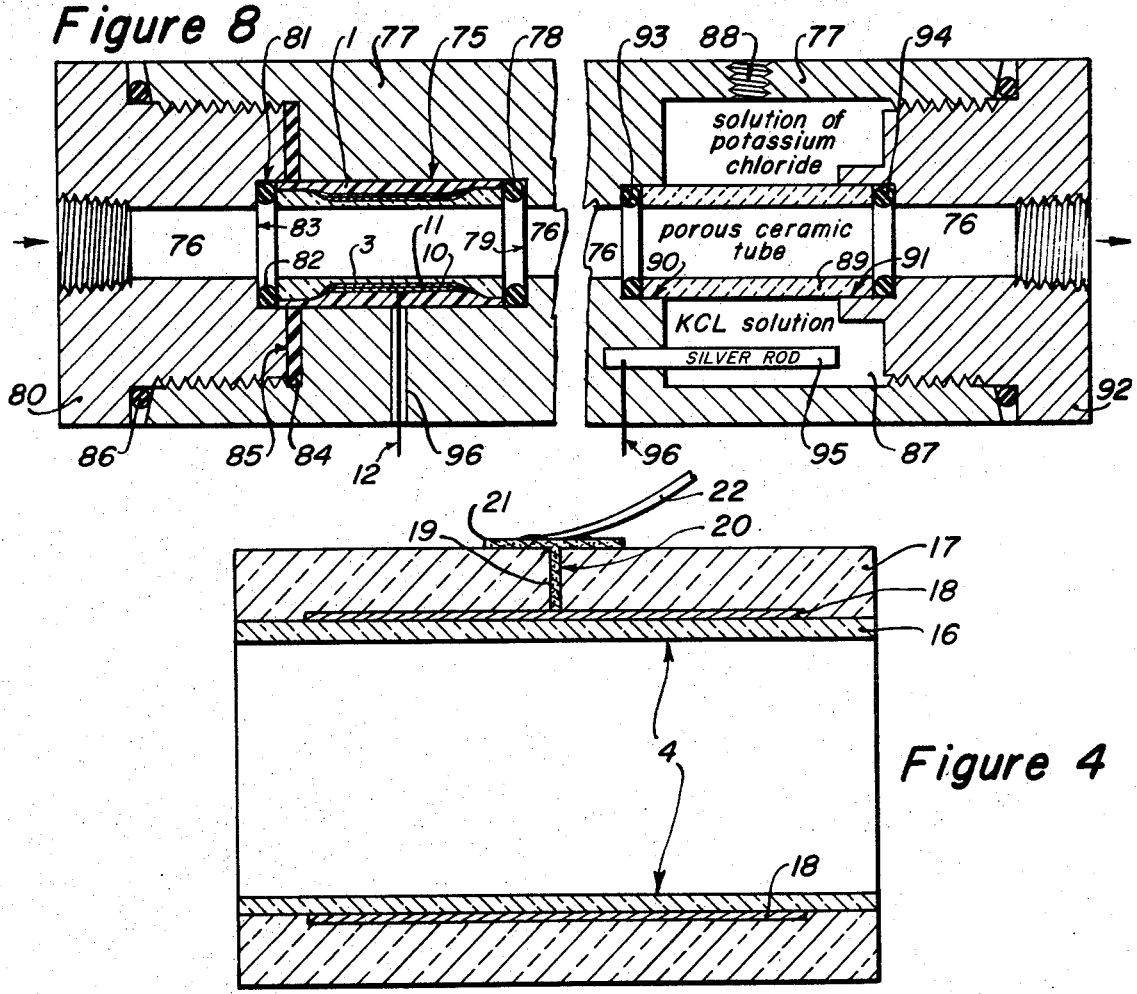
Figure 8
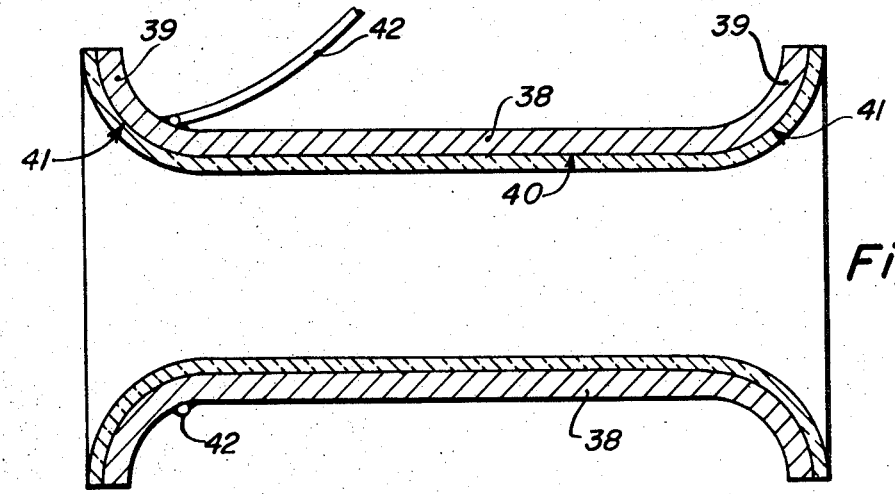
Figure 4
Figure 7
INVENTOR
OSCAR H. GRAUER
BY
Leonard L. Kalish
ATTORNEY

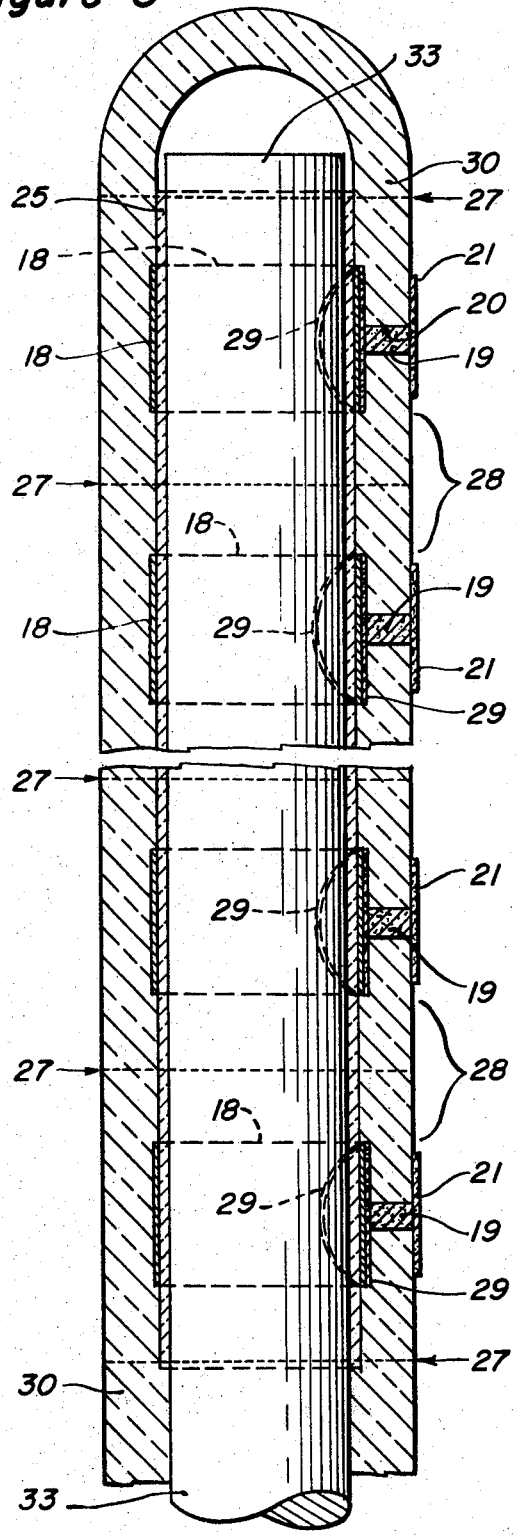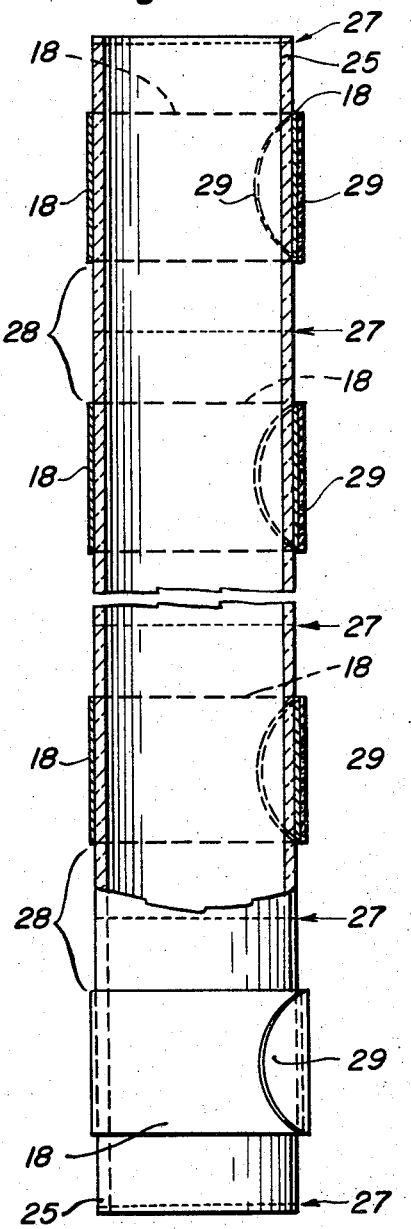

United States Patent Office 3,700,577
Patented Oct. 24, 1972

3,700,577
pH SENSING APPARATUS
Oscar H. Grauer, Philadelphia, Pa., assignor to Fischer & Porter Company, Warminster, Pa.
Filed July 21, 1966, Ser. No. 566,877
Int. Cl. G01n 27/36
U.S. Cl. 204—195 G          17 Claims

ABSTRACT OF THE DISCLOSURE

Through-flow pH-sensing apparatus including a thin glass membrane of pH sensitive glass having a thickness of the general order of .010", more or less, whose inner surface is generally a projection of the inner surface of the pipe-line on which the apparatus is mounted, such inner surface of said membrane facing and being adapted to and in contact with the liquid passing through said pipe-line, the outer surface of said membrane being de-glazed to form minute recesses therein, an electrically-conductive coating on said de-glazed outer surface, and a dielectric membrane-backing covering and in intimate contact with the outer surface of said membrane and the metal coating thereon and insulating the said conductive coating from the inner surface of said membrane.

---

The present invention relates to apparatus for measuring or sensing the hydrogen ion concentration (pH) in liquids, and particularly in streams of flowing liquids, and relates more particularly to what may be called the pH sensing cell or device as distinguished from the reference-cell; the measurement or indication of the pH of the liquid being accomplished by a reference-cell and a pH-indicator-cell. The pH-indicator-cell and the reference-cell are each sometimes also referred to as a half-cell.

The present invention also relates to pH-sensing apparatus including the pH-sensing cell and a reference cell.

The object of the present invention is a pH-sensing device which may be operatively juxtaposed to a flowing stream of liquid without any significant disturbance of its flow-pattern and which will be impinged upon by the flowing stream of liquid only tangentially or parallel to the liquid-exposed surface of the pH-cell, so that solid particles entrained in the liquid will not tend to accumulate on or around the pH-cell.

A further object of the present invention is a pH-sensing device which will be both sensitive and durable and which will minimize the hazards of break-down due to mechanical rupture or due to electrical leakage.

A further object of the present invention is a through-flow pH-sensing device which can be more readily mounted in a pipe line and can be readily removed and replaced.

In one aspect, my invention is a through-flow pH-sensing device of tubular formation whose bore (or part of whose bore) is a thin pH-sensitive glass membrane of circularly cylindrical shape, to whose outer cylindrical surface a fine crystalline metal, and more particular a noble metal, is adhered, and which device is capable of withstanding significant axial and radial stresses or forces without rupturing the thin-walled pH-sensitive glass membrane, and one which will minimize the hazard of electrical shunting leakage between the inner liquid-contacting face of the pH-sensitive glass membrane and the metal adhered to the outer surface thereof.

In another aspect, the present invention includes a through-flow pH-sensing device in which the thin glass pH-sensitive membrane and the fine crystalline metal adhered to the back thereof, are not tubular but instead are generally flat or but slightly curved and are similarly resistant to forces parallel to the membrane and to forces transverse to the membrane.

In another aspect, the present invention consists of the method of making through-flow pH-sensing devices which will be productive of a more sensitive and more durable device, and one at a lower cost, and the present invention also consists of constructional features productive of those desired end-results.

In the accompanying drawings like reference-characters indicate like parts.

FIG. 1 represents a cross-sectional view of a pH-sensing unit or cell of one embodiment of the present invention; this cross-sectional view being in a plane in which the axis of the cell lies.

FIG. 2 represents a cross-sectional view on line 2—2 of FIG. 1.

FIG. 3 represents a cross-sectional view on line 3—3 of FIG. 1.

FIG. 4 represents a cross-sectional view of a pH-sensing unit or cell of another embodiment of the present invention; this cross-sectional view being in a plane in which the axis of the cell lies.

FIG. 5 represents a schematic view, partly in section, of a multi-cell-length of thin-walled pH-sensitive glass tube having a number of bands of platinum (or of a noble metal) applied thereto and having thin layers of conductive materials on such bands; this figure illustrating steps in the method of making the embodiment shown in FIG. 4.

FIG. 6 is a schematic view of further steps in the method of making the embodiment shown in FIG. 4; this view being in cross-section in a plane in which the axis of the two glass tubes lie.

FIG. 7 represents a cross-sectional view of a pH-sensing unit or cell of another embodiment of the present invention.

FIG. 8 represents a cross-sectional view of pH-sensing apparatus including a flow-through pH-sensing unit or cell of any of the embodiments shown in FIGS. 1, 4 and 7, and including also a reference-cell.

Figure 9:
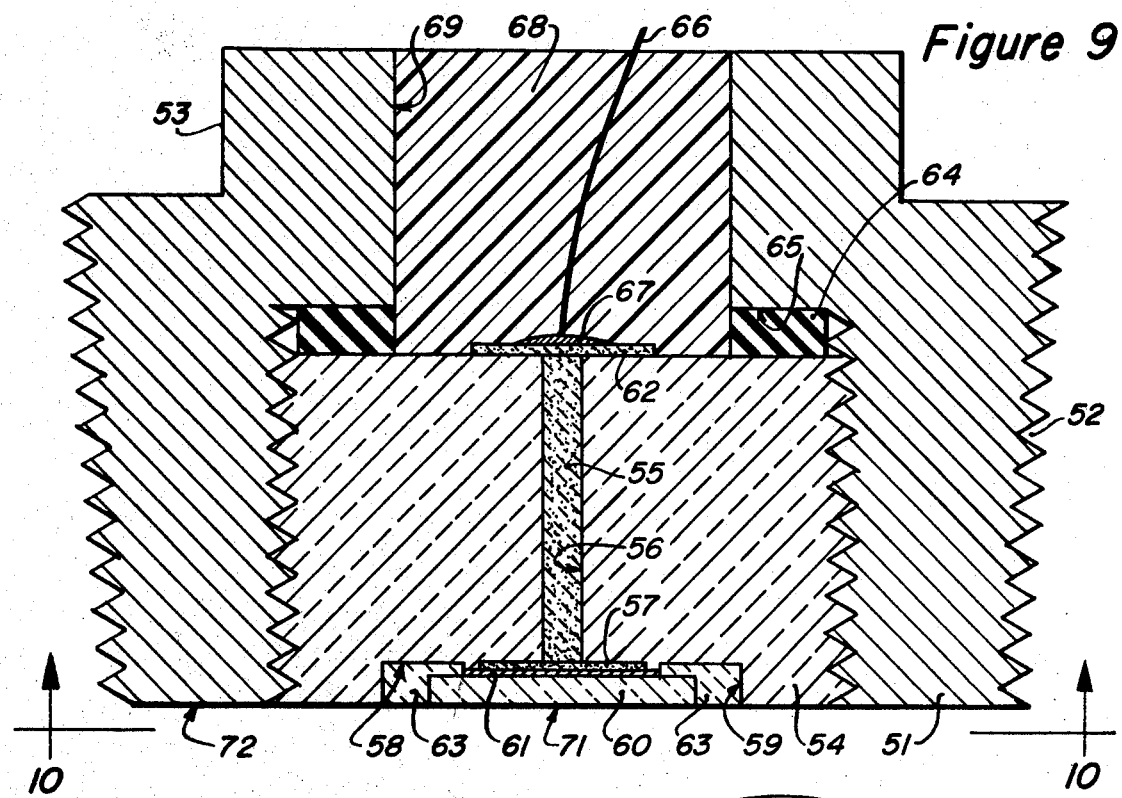
FIG. 9 represents another embodiment of the present invention in which the pH-sensing cell is formed in a metallic screw-plug which can be screw-threadedly mounted in a screw-threaded hole in the side of a large-diametered metal pipe through which the liquid flows whose pH is to be measured.

In one embodiment of the present invention I form a generally spool-shaped tubular glass body 1 of a pH-sensitive glass, namely, a glass responsive to hydrogen ions. The tubular glass member 1 includes the thickened or thick-walled end-zones or terminal portions 2 and the thin-walled intermediate pH-sensitive portion or membrane 3 of cylindrical shape.

The thick terminal portions 2 and the intermediate thin pH-sensitive membrane portion 3 have a common precision bore 4 of uniform circularly cylindrical formation. Intermediate the outer surfaces 9 and 14 of the surface 9 membrane portion 3 and outer surfaces 14 the terminal portions 2, reversely curved annular portions 5 and 6 are provided, formed as continuations of each other and as continuations of said outer surfaces of the portions 2 and 3.

The inner and outer circular annular edge portions 7 and 8 are preferably slightly chamfered or slightly round.

The sleeve-like glass body 1 is formed by first hot-flow-shrinking, under vacuum, a slightly oversized tube of relatively thick cross-section and of a length which may thereafter be subdivided into a number of pieces from which individual spool-like members 1 are thereafter formed.

A glass tube of such multiple cell-length is placed over a highly polished stainless steel mandrel having the precise diameter desired and having precise circularity, and with the ends of such tube sealed, a vacuum is drawn between the glass tube and the mandrel, and the glass is heated uniformly until it shrinks into intimate contact with the mandrel, thereby assuming for its bore the precise shape of the mandrel. Thereafter the assemblage of glass tube and mandrel are permitted to cool until the mandrel shrinks away from the glass. On cooling the glass is removed from the mandrel. The tube is then subdivided into suitable lengths for the spool-shaped glass body members 1.

For an instrument having a third of an inch diameter bore, the length of the spool-like body member 1 would be about an inch and a sixteenth long (more or less).

The ends of the so subdivided tubular glass pieces are ground to flat planer surfaces at a right angle to the axis of the tube, for intimate sealing contact with the rubber or neoprene washers 78 and 82 in the dielectric housing (77 and 80) (FIG. 8).

The center portion 9 and the portions 5 and 6 of the exterior surface of the so sized glass tube are then ground generally to the shape or exterior configuration indicated hereinabove and shown in FIG. 1; with the thickness of the membrane portion 3 just slightly greater than the final wall-thickness desired therefor. Thus, it is ground until the wall-thickness of the central membrane portion 3 is of the order of .014" to .015" (more or less).

Thereafter the outer cylindrical surface 9 of the membrane portion 3 and preferably (though not necessarily) also the outer surfaces 5 and 6 are etched so as further to reduce the wall-thickness of the membrane portion 3 to a thickness of the general order of about the .005" to .010" (more or less) and so as also to form a more intimate bond and a bond of greater area between the outer surface 9 of the membrane portion 3 (and between the surfaces 5 and 6 and the noble-metal layer 10 thereafter applied thereto.

Fine crystalline platinum or other suitable conductive noble metal layer or coating 10 is then applied to the etched surface 9 and to the surfaces 5 and 6 by chemical deposition or by vacuum evaporation or by other suitable means, to a thickness of several millionths of an inch.

Thereafter, a thin coating 11 of copper is electroplated onto the platinum or other noble-metal conductive coating 10; of the order of a few ten-thousandths of an inch.

Thereafter a lead-wire 12 is soldered to or conductively bonded to the copper layer 11 over the central portion 3 thereof or over the saddle portions 5 and 6 thereof.

Alternatively, I may first provide the electrical lead in the form of a thin flat ribbon 13 of copper or other conductive metal, having one end thereof soldered or otherwise conductively bonded or affixed to the copper plating 11 over central portion 3 thereof, with the free portion of the band 13 wrapped around the portion 3 thereof, one revolution, more or less, with a slight amount of slack, and with the lead-wire 12 soldered to the free end of the band 13.

Thereafter, the spool-like glass body member 1, with the aforementioned metal coatings (10 and 11) and with the aforementioned electrical lead (12 and 13), is placed into a mold forming an outer cylindrical molding-wall coaxial with the axis of the glass body member 1, and into this mold an epoxy resin is poured or otherwise inserted or applied, to fill the entire space between the enlarged ends 2 of the spool, so as to form a solid composite cylindrical tube of the radial thickness of ends 2, or, in the alternative, the epoxy resin may also be made to encase the outer surfaces 14 of the spool-ends 2, as indicated in FIGS. 1, 2 and 3, to form the outer epoxy or other plastic envelope 15.

The chemically deposited platinum or other suitable conductive noble metal 10 is of fine crystalline form, in order to penetrate all the interstices of the ground and etched outer surface 9 of the tubular membrane portion 3 (and of the saddle portions 5 and 6) of the spool-like glass body member 1, so as to provide the maximum effective area of electrical contact between the metal layer 10 and outer glass surface 9. This has the effect of increasing the overall effective area of the glass electrode, thus decreasing the overall ohmic resistance of the glass membrane portion 3 and of enhancing the electrical current response to the electromotive force (EMF) produced by the instrument reflective of the pH of liquid.

In the embodiment shown in FIG. 4, a thin-walled inner glass tube 16 of pH-sensitive glass and an outer thick-walled glass tube 17 are laminated to each other by thermal fusion, with a noble metal coating 18 therebetween and with a conductive lead 19 extending through a radial hole 20 in the thick-walled outer tube 17 and a patch-like conductive terminal 21 on the outside of the tube 17, to which the lead-wire 22 is soldered or otherwise conductively secured.

FIGS. 5 and 6 are schematic representations of steps in a method of making the two-ply glass construction shown in FIG. 4.

A thin-walled tube 25 of pH-sensitive glass, of a length sufficient to form a number of pH-sensing units, is first heat-and-vacuum shrunk onto a polished stainless steel mandrel of uniform diameter and circularity by the heat-and-vacuum shrinking method mentioned above. Thereafter, such multi-cell-length tube 25 is ground on the outer surface thereof (concentrically with its inner precision bore) so as to reduce its wall-thickness to something of the order of .014" to .015", and thereafter the so ground outer surface thereof is etched to further reduce the wall-thickness of a few thousandths of an inch to approximately .010", and to strengthen the tube.

Thereatfer, annular bands 18 of fine crystalline platinum or other noble metal are formed on the outer etched surface of the thin-walled glass tube 16 at suitable intervals so that when the two-ply glass tube shown in FIG. 6 (including glass tube 25) in later divided into cell lengths, by cutting along annular severance-lines 27 halfway between the two adjacent bands 18, the so divided pieces of glass will be approximately cell length.

It is to be understood that the axial lengths of the metal bands 18 shown in FIGS. 5 and 6 and the intermediate tube portions 28 and the cell-lengths indicated by the cutting-lines 27, are not shown proportional to actual dimensions or sizes, and the diameters and wall-thicknesses shown in these figures are likewise not shown in proportion to actual dimension; such proportionality being deemed unnecessary for purposes of illustration.

The fine-crystalline platinum (or other noble metal) bands 18 are formed on the ground and/or etched outer surface of the multi-cell-length thin-walled glass tube 25 by chemical deposition or by vacuum evaporation or other suitable means; with the portions 28 of the glass tube 25 intermediate the platinum bands 18 being left uncoated. The platinum (or other noble metal) bands 18 are of the thickness of the order of a few millionths of an inch.

In one embodiment, copper may be eletroplated onto the platinum bands 18, to a thickness of a few ten-thousandths of an inch.

In another embodiment a thin patch 29 of electrically conductive fine glass frit (consisting of low-melting glass powder and conductive metal powder such as silver intermixed therewith) is painted onto the platinum or noble metal band 18 as indicated in FIGS. 5 and 6.

Another glass tube 30, having a wall-thickness of the order of .060" and somewhat longer than the tube 25 and preferably closed at one end thereof, is provided with radial holes 20 at the same spacing as the metal bands 18 on the tube 25. The inner diameter of the thick-walled tube 30 is just slightly greater than the outer diameter of the metal bands 18 on the thin-walled tube 25.

Instead of painting the aforementioned patches 29 of electrically conductive frit onto each of the metal bands 18, similar patches of electrically conductive frit may be painted on the inner surface of the thick-walled glass tube 30 surrounding the inner ends of the radial holes 20 extending therethrough. The radical holes 20 are filled with an electrically-conductive glass-and-metal frit 19 and similar conductive frit patches 21 are painted on the outer surface of the thick-walled glass tube 30 adjacent the outer ends of the holes 20, in operative contact with and as continuations of the frit portions 19 in said holes 20.

Thereafter, the thick-walled outer tube 30 is fired at a temperature above the softening point of the conductive glass frit (19, 21 and 29) but below the softening point of the tube 30; thereby to fuse the conductive mixture of frit and metal particles and to fuse such frit and the glass tube 30 to each other, thereby to form the conductive radial leads terminating in the thin outer and inner conductive patches 21 and 29.

Thereafter, the outer tube 30 and the inner tube 25 (having the platinum bands 18 thereon) are telescoped together, so that their effective ends register with each other, as indicated in FIG. 6, and so that the radial holes 30 register with the centers of the platitum bands 18. The mandrel 33 is telescoped into the tube 25.

Thereafter, vacuum is drawn on the inside of the tube 20 and hence also in the slight clearance between the inner tube 25 and the outer tube 30 and between the inner tube and the mandrel 33. While so under vacuum, heat is applied to such telescoped assemblage, until the inner tube 25 is shrunk to the outer surface of the mandrel 33 and the outer tube 30 is shrunk to the outer surface of the inner tube 25 and the two tubes are fused to each other throughout the uncoated or unmetalized annular portions 28 thereof, thereby making an intimately united laminated structure in which the outer glass tube 30 is also adhered to the platinum bands 18.

Thereupon the assemblage is permitted to cool and the mandrel removed.

The resultant laminated tube is then divided into cell-lengths thereof, along annular severance-lines 27.

The ends of the so divided cell-length pieces are ground to flat planar surfaces at right angle to the axis thereof.

The inner conductive metalized patches 29 become fused to and form intimate electrical contact with the platinum bands 18, and together with the conductive radial plugs 19 and the outer conductive patches 21, form externally accessible leads to the respective platinum bands 18.

The outer conductive patches 21 may then be plated with copper or any other suitable conductive metal, and then tinned. Wire leads 22 are then soldered thereto or otherwise conductively adhered thereto.

The axial length of the noble metal bands 18 is generally of the same order as the axial length of the thin-walled membrane portion 3 in the embodiment shown in FIGS. 1 to 3, and the distance between successive bands 18 (in FIG. 5) is of the order of the difference between the axial length of the bands 18 and the axial length of the finished cell; the cell-length being of the same order as that of the embodiment shown in FIGS. 1 to 3. In this embodiment of FIGS. 4 to 6 I may prefer to omit the copper or other conductive metal plating over the platinum layer.

In the embodiment shown in FIG. 7, a thin-walled inner tube 16 of pH-sensitive glass is prepared in the same way as in connection with the embodiment shown in FIG. 4, and a multi-cell-length tube thereof is similarly coated with spaced-apart bands 18 of platinum or of other noble metal.

However, in this embodiment, the platinum bands 18 are plated with copper or other suitable conductive metal to a thickness of the order of a few ten-thousandths of an inch. The outer surfaces of these plated copper layers are then tinned, and thereafter lead-wires (copper or other conductive metal) are soldered or otherwise conductively secured thereto, as, for instance, by a conductive bonding material such as silver-filled epoxy-resin.

Thereafter, such multi-cell-length of pH-sensitive glass tube is similarly divided into individual pieces of approximately the length of a single cell, along the annular severance-lines indicated hereinabove.

The individual cell-length piece (of the so metalized thin-walled glass tube) is then mounted co-axially in a mold whose inner diameter is greater than the outer diameter of the tube by an amount equal to the desired thickness of the encasing plastic; the lead-wires 34 extending through a suitable hole in the wall of the mold, and vent-holes being also provided for airing of the mold so as to insure that the mold is completely filled with the plastic.

Thereupon the space between the inner wall of the mold and the outer cylindrical surface of the metal-plated cell-length of the thin-walled tube is filled with an epoxy resin or any other suitable resin, and the same is hardened, so as fully to encase not only the metal coated portion of the glass tube but also the uncoated or bare end-surfaces thereof; such plastic forming a fluid tight seal with such uncoated end-surfaces.

In the embodiment last described, the un-metalized ends of the glass tube may be also fire polished to increase their strength; such fire polishing being also usable slightly to thicken the ends of the glass tube in a radial direction.

In the embodiment shown in FIG. 7, a relatively thick-wall and rigid metal tube 38 is formed with outwardly flaring ends 39; the tube 38 being formed of a metal compatible with the thermal coefficient of expansion of pH-sensitive glass and compatible with the other thermal properties of such glass.

The thickness of the metal tube 38 is such as to be completely self-sustaining both radially and axially and adequate to resist the radial and axial forces which may be imposed upon the cell in actual usage.

Thereafter the inner cylindrical surface 40 and the curved end-surfaces 41 of such metal tube are coated with a thin layer of fine frit of pH-sensitive glass of uniform thickness, and dried. Thereafter the so coated metal member 38 is fired until the frit has been firmly fused to the aforementioned inner surfaces 40 and 41 of the tube 38.

A lead-wire 42 may then be applied to the outer surface of the tube 38 either mechanically or by soldering or by bonding thereto with a conductive adhesive or bonding material.

Figure 10:
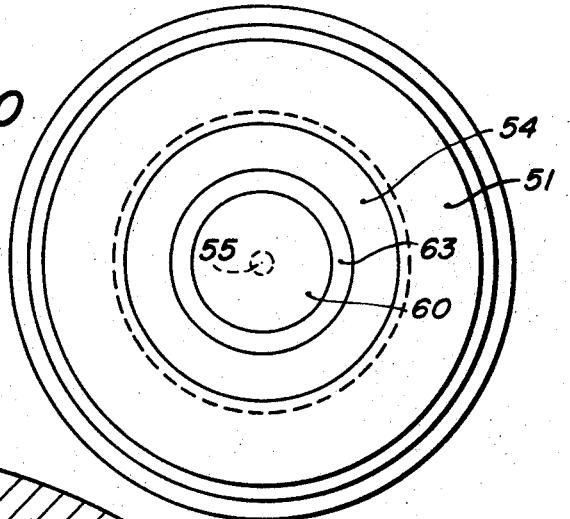
FIG. 10 represents an end view of the embodiment shown in FIG. 9, as viewed on line 10—10 of FIG. 9.
Figure 11:
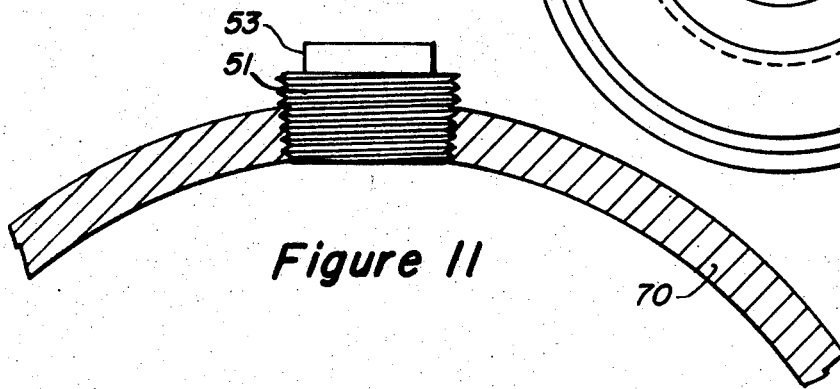
FIG. 11 represents a fragmentary cross-sectional view of a large-diametered metal pipe through which liquid whose pH is to be measured flows, showing the plug of FIG. 9 mounted in the wall of the pipe.

In the embodiment shown in FIGS. 9 to 11, I provide a hollow screw-plug 51 having an outer pipe-thread 52 and having a smaller diametered outer wrench-receiving or tool-receiviing portion 53 with a hexagonal or other suitable outer surface for the reception of the wrench or other tool for turning the plug.

An inner electrically insulating plug 54 of ceramic, plastic, glass or the like is disposed within the outer metallic screw-plug 51. An electrical conductor 55 extends through the plug 54, may be either embedded in the plug 54 while the latter is formed by molding or casting, or a hole 56 may be provided in the insulating plug 54 which is thereafter filled with an electrically conductive cement or frit 55; terminating in an inner conductive patch 57, which may be formed of an electrically conductive cement or frit.

A shallow recess 58 is formed on the inner face of the insulating plug 54, with the outer periphery 59 of the recess 58 spaced a suitable distance from the outer periphery of the plug 54. A thin disc-like pH-sensitive glass membrane member 60 is inserted in the shallow recess 58, and is cemented therein or fused thereto, depending on the material of which the inner insulating plug 54 is formed. The thickness of the disc 60 is of the order of .005" to .010" (more or less).

Prior to the insertion of the glass membrane disc 60, the inner or back surface thereof is ground and/or etched and then coated with a finely crystalline platinum or other noble metal coating 61 of the order of a few millionths of an inch in thickness, in the manner hereinabove indicated.

In one embodiment, the plug 54 is formed of a ceramic or of a glass compatible with the pH-sensitive glass disc 60. In this form, a conductor-hole 56 is provided through the plug 54 which is thereafter filled with a conductive cement or conductive frit, with an inner conductive patch 57, and with a similar conductive patch 62 formed on the outer face of the plug 54.

Thereafter the platinum coated or silver coated pH-sensitive glass disc 60 is inserted into the recess 58 and a glass frit 63 placed around disc 60. Thereupon the plug 54 is fired at a temperature above the softening temperature of the conductive frit 55 (in the conductor-hole) and the conductive-frit patches 57 and 62 and the conductive disc-sealing frit 63 and below the softening point of the glass or ceramic material of the plug 54 and of the pH-glass disc 60.

Preferably, the ceramic plug 54 is first fired merely with the conductive frit 55 in the conductor-hole 56 and with the conductive-frit patches 57 and 62, to form the completed through-conductor 55 and thin conductive patches 57 and 62 (of frit), and thereafter the platinum-coated or silver-coated pH-disc 60 is inserted in the recess 58 and surrounded by the non-conductive frit 63 and then again fired to seal the disc 60 in place by means of the frit 63; the frit 63 containing no conductive material but being of an insulating character and having a softening point lower than that of the pH glass of the disc 60.

Instead of depositing the thin layer or film of electrically conductive metal on the back surface of the pH-sensitive glass membrane by the aforementioned chemical deposition or vacuum evaporation, etc., I may alternatively coat the back surface of the pH-sensitive glass membrane with an electrically conductive organic or inorganic cement or bonding material, consisting of finely divided metallic powder intimately dispersed through particles of bonding material such as an epoxy resin or other suitable synthetic resin or an inorganic cement or a finely powdered glass frit. In the case of such electrically conductive epoxy resin or other resin and in the case of such electrically conductive inorganic bonding material, such resin or bonding material is coated onto the back surface of the pH-sensitive membrane in a thin layer, and then is caused to set and harden and so to adhere to the back surface of the pH-sensitive glass membrane. In the case of the fine electrically conductive metallic powder dispersed through the fine glass frit of softening point lower than that of the pH-sensitive glass membrane, the admixture of glass powder and metal powder is coated onto the back surface of the pH-sensitive glass membrane and such glass membrane is thereafter fired at a temperature above the softening point of the frit but below the softening point of the pH-sensitive glass membrane to cause the glass powder to be fused into a continuous layer and to cause such layer to be fused to the back surface of the glass membrane, thus causing the resultant electrically conductive glass layer to be in intimate contact with the back surface of the pH-sensitive glass membrane.

The ceramic or other electrically-insulating plug or insert 54 may be screw-threadedly mounted in the hollow metallic screw-plug 51, as indicated in FIG. 9, or the wall of the inner chamber in the metallic plug 51 (which is adapted to receive the insulating plug or insert 54) may be inwardly large or otherwise undercut and an insulating plug or insert 54 may be formed therein by molding or casting same in situ, or it can be otherwise locked therein in the chamber. If the inner electrically insulating plug or insert 54 is screw-threaded into the hollow metallic plug 51, then a sealing gasket 64 may be provided between the inner end surface of the plug 54 and a shoulder 65 in the hollow metallic plug 51. A lead-wire 66 may be secured to the electrically conductive patch 62 by means of any suitable electrically conductive bonding material 67, and an insulating material 68 (of plastic or the like) may be cast in situ the outer chamber 69 of the hollow metallic plug 51. In this case the lead-wire 66 may be embedded in the plastic 68.

The pH-sensing unit shown in FIGS. 9 and 10 is inserted into the side-wall of a large-diametered pipe 70 through which the liquid flows, whose pH is to be measured, as indicated in FIG. 11. It will be seen that in this embodiment as well, the liquid flows parallel to the liquid-exposed surface 71 of the pH-sensitive glass membrane element 60, so that there will be no tendency for liquid-entrained solid particles to accumulate on the pH-sensitive cell.

In the embodiment shown in FIGS. 9 to 11, a reference-cell may be formed in a manner similar to the pH-sensing cell of FIG. 9, by providing a sufficiently thick-walled porous ceramic plug or insert in an outer hollow metallic screw-plug similar to the screw-plug 51, with the inner face of such porous ceramic insert generally flush with the inner surfaces 72 of such hollow metallic plug 51, and with a solution of potassium chloride filling the outer chamber 60 of the metallic screw-plug, under suitable pressure, supplied by any suitable conventional potassium chloride solution supplying and pressurizing means.

The through-flow embodiments of pH-sensing cells illustrated in FIGS. 1, 2, 3, 4 and 7, are mounted in an enlarged cylindrical chamber 75 in a through-passageway 76 in the insulating housing 77 (as indicated in FIG. 8) formed of a chemically inert impact-resistant synthetic resin plastic. A sealing gasket or ring, such as the O-ring 78, is operatively interposed between the inner end of the pH-sensing cell and shoulder 79 in the housing 77. A tubular screw-plug 80 (of similar plastic) is screw-threaded into the end of the housing 77 in operative juxtaposition to the outer end of the pH-sensing cell, with the outer end of the latter telescoped into a counterbore 81 of such screw-plug (thereby to center it), and with an O-ring or other suitable sealing gasket 82 operatively juxtaposed between the outer end of the pH-sensing cell and the shoulder 83 in the screw-plug 80. A sealing gasket 84 may also be interposed between the inner end of the screw-plug 80 and the shoulder 85 in the housing 77, and an O-ring 86 may be operatively interposed between the outer enlarged flange or head of the screw-plug 80 and the outer end of the housing 77.

At the other end of the housing 77 an annular liquid-receiving chamber 87 is formed, with a liquid supply and pressurizing inlet 88 leading thereto, through which a solution of potassium chloride is maintained in said chamber 87 under suitable pressure. A porous ceramic tube 89 (as, for instance, of an unglazed porous porcelain) is operatively disposed within the liquid chamber 87, with the ends thereof telescoped into the enlarged counterbore 90 in the housing 77 and the enlarged counterbore 91 in the tubular screw-plug 92 and with the ends thereof sealed in said counterbores by means of the O-rings 93 and 94, respectively, as shown in FIG. 8. A silver rod 95 preferably having a conventional silver chloride coating or any equivalent conventional reference electrode is operatively mounted in the housing 77, so that a large portion thereof projects into the liquid chamber 87, where it is immersed in the potassium chloride maintained in said chamber. An electrical lead-wire 96 is electrically connected to the silver rod 95 and extends through the housing 77 to the exterior thereof. The lead-wire (12, 22 or 42) from the pH-sensing cell is extended to the exterior of the housing 77 through a suitable hole 97 extending through the housing 77.

By the pH-sensing cells of the present invention a more uniform sampling of the liquid is also obtained.

Having shown and described embodiments of my invention, I claim the following:

1. A pH-sensing glass electrode device including a thin pH-sensitive glass membrane having its back surface de-glazed to form therein minute recesses, and a thin layer of an electrically-conductive crystalline metal intimately adhered to said de-glazed back-surface and entering such minute recesses.

2. A pH-sensing electrode device according to claim 1 which includes a relatively rigid dielectric membrane-backing adhered to the back surface of said membrane and to the metal layer thereon and forming an electrical insulation between such metal coating and the front face of said membrane.

3. A pH-sensing glass electrode device according to claim 2, in which the thin metal layer is of a noble metal.

4. A pH-sensing glass electrode device according to claim 3, in which the layer of noble metal is plated with another electrically conductive metal.

5. A pH-sensing glass electrode device according to claim 1, in which the thin metal layer is of a noble metal.

6. A pH-sensing glass electrode device according to claim 5, in which the layer of noble metal is plated with another electrically conductive metal.

7. pH-sensing apparatus including a thin pH-sensitive glass membrane having one surface thereof facing the liquid whose pH is to be sensed and arranged to have its said surface in contact with said liquid and having the back surface thereof de-glazed to form minute recesses therein and having a thin layer of an electrically-conductive crystalline metal intimately adhered to said de-glazed back-surface and entering such minute recesses therein, means electrically insulating said metallic layer from the liquid-facing surface of said membrane, a reference electrode in operative juxtaposition to said pH-sensitive glass membrane and having liquid-contacting means facing the liquid whose pH is to be sensed and arranged to be in contact with said liquid and to have an electrically conductive path formed between it and the pH-sensitive glass membrane through the liquid whose pH is to be sensed.

8. A pH sensing apparatus according to claim 7, in which the thin metal layer is a noble metal.

9. A pH sensing apparatus according to claim 8, in which the noble metal layer is plated with another electrically conductive metal.

10. pH sensing apparatus according to claim 7, including a relatively rigid dielectric membrane-backing adhered to the back surface of the pH-sensitive glass membrane and to the metal layer thereon and forming an electric insulation between such metal layer and the liquid-facing surface of said membrane.

11. A flow-through pH-sensing glass electrode device including an inner thin-walled tube of pH-sensitive glass open at both ends forming a liquid passageway for the flow therethrough of the liquid whose pH is to be sensed, a thin metal layer coating at least a portion of the outer surface of said thin-walled glass tube and in intimate contact therewith but not covering the end-zones thereof, and an outer glass tube encasing said inner pH-sensitive glass tube and the metal layer thereon and in intimate contact with said metal layer and fused to the juxtaposed end-zones of said inner pH sensitive glass tube and electrically insulating the inner surface of said inner glass tube from said metal layer thereon.

12. A flow-through pH-sensing glass electrode device in combination with a pipe-line, said device including a glass tube of pH-sensitive glass open at both ends and interposed in the pipe-line and forming a liquid passageway for the flow therethrough of the liquid whose pH is to be sensed, said glass tube including:

(a) a thin-walled portion intermediate the below-mentioned end-portions thereof and having a wall-thickness of approximately .010", and (b) two opposite thick-walled end portions integral with said intermediate thin-walled portion and having a wall-thickness greater than the wall-thickness of said intermediate thin-walled portion thereof in a radially outward direction, a thin metal layer coating at least a portion of the outer surface of said thin-walled intermediate portion of the glass tube and in intimate contact therewith, and a relatively rigid tubular dielectric membrane-backing encasing said intermediate thin-walled portion of the glass tube and the metal layer thereon and adhered thereto and encasing the thick-walled end portions of said glass tube and adhered thereto, said membrane-backing electrically insulating the inner surface of said glass tube from said outer metal layer thereon.

13. A flow-through pH-sensing glass electrode device according to claim 12, in which the glass tube is encased in a thermoplastic dielectric material intimately adhered to the pH-sensitive glass tube and to the metallic coating thereon and to the thickened end-zones of the glass tube.

14. A laminated tubular pH-sensing electrode open at both ends and forming a liquid passageway through which flows the liquid whose pH is measured, said electrode including a thin-walled inner tube of pH-sensitive glass, an electrically conductive layer covering at least a portion of the outer surface of said pH-sensitive inner glass tube and in intimate contact therewith, but the end portions of the outer surface of said inner glass tube not being covered by said electrically conductive layer, and an outer glass tube surrounding and fused to the portions of the outer surface of said inner pH-sensitive tube which are not covered by said electrically conductive layer, said outer glass tube reinforcing said inner pH-sensitive tube and forming an electrical insulation between said electrically conductive layer and the inner surface of said pH-sensitive inner glass tube.

15. A laminated pH-sensing electrode according to claim 14, including means for forming an electrical connection to said electrically conductive layer.

16. pH-sensing apparatus including a dielectric housing having a tube-receiving hole therethrough, having two tube-receiving sockets therein, whose outer ends are opened, a tubular pH-sensing electrode in one of said sockets including a thin-walled tube of pH-sensitive glass, an electrically-conductive layer on at least a portion of the outer surface thereof and a dielectric backer encasing said thin-walled pH-sensitive tube and said electrically-conductive layer and insulating the latter from the inner surface of said pH-sensitive glass tube, a tubular reference electrode member in the other socket, a dielectric separator-wall between the inner ends of said two tubular members having a passageway therethrough forming a part of the liquid passageway through the said two tubular members, means sealing the inner ends of said tubular members in relation to the opposite sides of said separator-wall, means sealing the outer ends of said tubular members in relation to the outer ends of their respective tube-receiving sockets, a liquid chamber in said dielectric housing surrounding said tubular reference electrode member intermediate the so sealed ends thereof, and a passageway extending from said chamber to an outer surface of said dielectric housing for supplying and maintaining an electrically conductive aqueous solution in said chamber in contact with said tubular reference electrode member.

17. Through-flow pH-sensing apparatus including a generally tubular housing of a dielectric material having a passageway therethrough for the through-flow of the liquid whose pH is to be measured, a tubular pH-sensing cell sealingly mounted in said passageway, said cell comprising a thin-walled pH-sensitive glass tube having a metal layer on the outer surface thereof in intimate contact therewith and an electrical-lead extending from said metal layer exteriorly of said housing, a porous tube sealingly mounted in said passageway spaced from said pH-sensing cell, a liquid chamber in said housing bounded in part by the outer surface of said porous tube, an inlet for said chamber for supplying a liquid electrolyte thereto, an electrode mounted in said housing and a conductor extending from said electrode exteriorly of said housing; the passageway through said tubular housing and said tubular pH-sensing cell and said porous tube forming a continuous passageway for the flow of the liquid whose pH is to be measured.

References Cited

UNITED STATES PATENTS

| | | | |
|---|---|---|---|
| 2,383,450 | 8/1945 | Coleman | 204—195.1 |
| 2,925,370 | 2/1960 | Rohrer | 204—195 |
| 3,211,640 | 10/1965 | Leonard et al. | 204—195.1 |

FOREIGN PATENTS

| | | | |
|---|---|---|---|
| 492,936 | 9/1938 | Great Britain | 204—195.1 |

TA-HSUNG TUNG, Primary Examiner

U.S. Cl. X.R.

65—36, 60; 204—195 F